United States Patent [19]

Asanuma et al.

[11] Patent Number: 4,729,772

[45] Date of Patent: Mar. 8, 1988

[54] SEPARATION METHOD OF POLYMER POWDER AND CARRIER GAS

[75] Inventors: Tadashi Asanuma; Yoshiyuki Funakoshi; Kaneo Ito; Akihiko Nakajima, all of Takaishi, Japan

[73] Assignee: Mitsui Toatsu Chemicals, Incorporated, Tokyo, Japan

[21] Appl. No.: 936,771

[22] Filed: Dec. 2, 1986

[51] Int. Cl.[4] .............................................. B01D 45/12

[52] U.S. Cl. .............................................. 55/18; 55/1

[58] Field of Search ................. 55/1, 17, 18, 215, 216, 55/218, 410, 431, 459 R

[56] References Cited

U.S. PATENT DOCUMENTS

| | | | |
|---|---|---|---|
| 2,209,339 | 7/1940 | Knight | 55/1 |
| 2,830,674 | 4/1958 | Dolf et al. | 55/218 X |
| 2,848,381 | 8/1958 | Nicholson | 55/431 X |
| 2,849,079 | 8/1958 | Evans | 55/218 X |
| 2,943,704 | 7/1960 | Coates et al. | 55/218 X |
| 3,040,015 | 6/1962 | Cheney et al. . | |
| 3,179,471 | 4/1965 | Savage | 55/459 R X |
| 3,188,783 | 6/1965 | Savage | 55/459 R X |
| 3,249,424 | 5/1966 | Phillips et al. | 55/218 X |
| 3,545,735 | 12/1970 | Wolf et al. | 55/459 R X |
| 4,128,404 | 12/1978 | Stamatiou et al. | 55/1 |
| 4,655,806 | 4/1987 | Bowersox | 55/410 X |

FOREIGN PATENT DOCUMENTS

| | | | |
|---|---|---|---|
| 39-3587 | 4/1964 | Japan . | |
| 90329 | 8/1974 | Japan . | |
| 65367 | 5/1977 | Japan | 55/431 |

*Primary Examiner*—Robert Splitzer
*Attorney, Agent, or Firm*—Oblon, Fisher, Spivak, McClelland & Maier

[57] ABSTRACT

Polymer powder is separated from a carrier gas by separating the polymer powder from the carrier gas in a cyclone separator, drawing the thus-separated polymer powder through a bottom part of the separator into a hopper, feeding out the polymer powder by a rotary feeder from the hopper while controlling the revolution speed of the rotary feeder in accordance with the powder level in the hopper, and controlling the volume of a purge gas, which is introduced into a polymer powder guide extending between the separator and the hopper for the prevention of plugging thereof, in accordance with the revolution speed of the rotary feeder. The height of the top of the powder in the hopper is maintained at a predetermined constant level.

4 Claims, 1 Drawing Figure

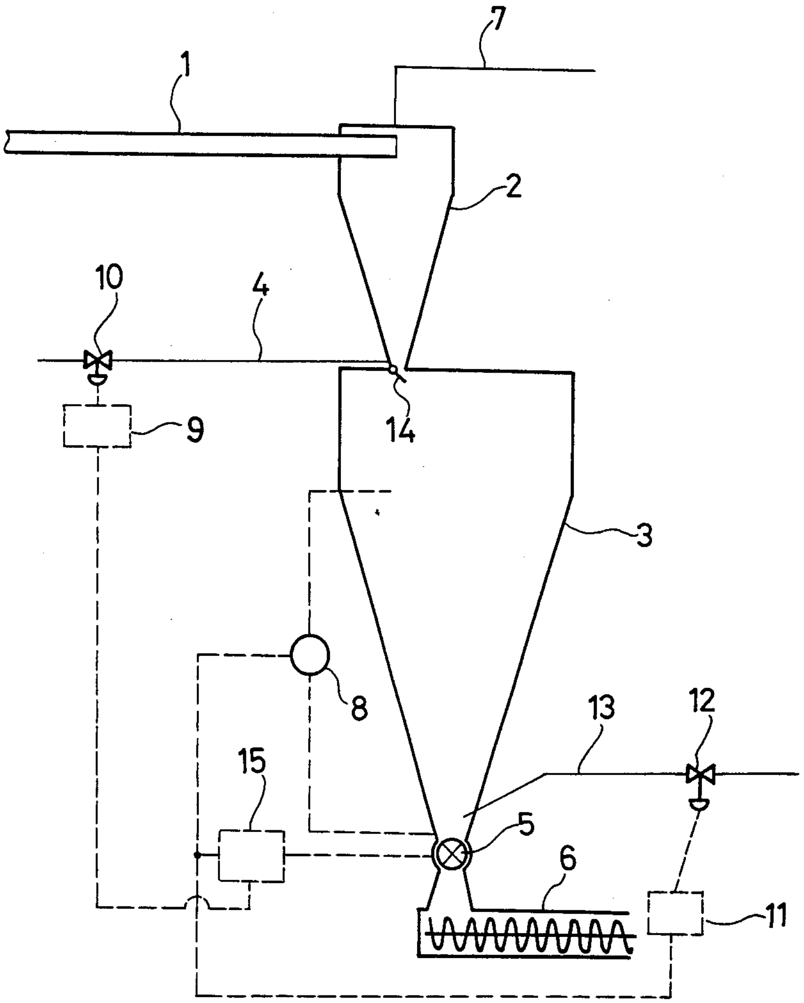
1
2
3
4
5
6
7
8
9
10
11
12
13
14
15

SEPARATION METHOD OF POLYMER POWDER AND CARRIER GAS

BACKGROUND OF THE INVENTION (a) Field of the Invention

This invention relates to an improved method for separating polymer powder from a carrier gas by introducing a mixture of the polymer powder and carrier gas into a cyclone separator and feeding out the thus-separated polymer powder by a rotary feeder from a hopper provided below the cyclone separator.

(b) Description of the Prior Art

It has been widely known to introduce a mixture of a polymer and one or more highly volatile monomers, which mixture has been obtained upon polymerization of the monomers, as a mixed stream of monomer gas and polymer powder into a cyclone separator, to draw the monomer gas from an upper part of the cyclone separator, to draw the polymer powder through a lower part of the cyclone separator into a hopper and then to feed out the polymer powder from the hopper upon separation of the mixture into the polymer and the monomer or monomers (see, for example, Japanese Patent Publication No. 3587/1964 and Japanese Patent Laid-Open No. 90329/1974). It is also routinely practiced to convey polymer powder as its mixture with a carrier gas and then to separate the thus-conveyed mixture in the same manner as that described above. It is also commonly practiced to adjust the amount of a polymer, which is to be discharged out from a hopper, by using a rotary feeder and varying the revolution speed of the rotary feeder.

In an actual production process of polymer powder, the amount of polymer powder to be introduced in a cyclone separator is not always constant but is subject to variations. Moreover, the flowability of the polymer powder changes depending on the molecular weight, composition, etc. of the polymer. When the rotary feeder is driven at a constant revolution speed, the above-mentioned variations may lead to variations in the powder level in the hopper and, in some instances, may result in clogging of the hopper. Reduced flowability of the polymer powder may on the other hand lead to clogging of a polymer powder guide disposed between the cyclone separator and hopper. As a result, the separation of the polymer powder from the carrier gas in the cyclone separator may become no longer feasible. Accordingly, the cyclone separator is usually operated while controlling the revolution speed of the rotary feeder in such a way that the height of the top of the powder in the hopper is maintained at a constant level. This method is however not effective for the possible clogging between the cyclone separator and hopper.

OBJECT OF THE INVENTION

An object of this invention is to provide an improved method for separating polymer powder from its carrier gas in a cyclone separator without problems such as clogging by the polymer powder.

SUMMARY OF THE INVENTION

The above object of this invention can be achieved by the following method for the separation of polymer powder from a carrier gas:

In a method for separating polymer powder from a carrier gas by introducing a stream of a mixture of the polymer powder and carrier gas into a cyclone separator, drawing the polymer powder, which has been separated from the carrier gas, through a bottom part of the cyclone separator into a hopper, drawing the carrier gas from an upper part of the cyclone separator and feeding out the polymer by a rotary feeder from the bottom part of the cyclone separator, the improvement wherein the revolution speed of the rotary feeder is controlled in accordance with variations in the powder level in the hopper so as to control the amount of the polymer powder to be discharged out from the hopper. The volume of a purge gas which is introduced into a polymer powder guide extending between the cyclone separator and the hopper for the prevention of plugging thereof is controlled in accordance with variations in the revolution speed of the rotary feeder, whereby the plugging of the guide between the cyclone separator and hopper are prevented and the powder level in the hopper is maintained at a predetermined constant level.

BRIEF DESCRIPTION OF THE DRAWING

The accompanying sole drawing is a schematic illustration showing one example of an apparatus suitable for use in the practice of the present invention.

DETAILED DESCRIPTION OF THE INVENTION

The polymer powder useful in the practice of the method of this invention may, for example, be powder of a polymer of ethylene, propylene, styrene, vinyl chloride or a mixture thereof, a copolymer of any one of the above monomers and another copolymerizable monomer, polyphenylene oxide, polyether imide, polyphenylene sulfide, of the like. The method of this invention is applicable to such polymer powders so long as they have particle sizes permitting their conveyance by carrier gases. Taking polypropylene by way of example, its conveyance by a carrier gas and its separation from the carrier gas by a cyclone separator can be achieved efficiently so long as it is in the form of powder the average particle size of which falls within a range of 0.05–5 mm. In the case of powder the average particle size of which exceeds 5 mm, its separation can be achieved without need for a cyclone separator, for example, by simply lowering the linear velocity of a stream of the polymer powder and a carrier gas. On the other hand, particles having an average particle size smaller than 0.01 mm cannot be effectively separated by a cyclone separator.

As exemplary carrier gases useful in the practice of the method of this invention, there may be mentioned monomers employed for the production of the above-mentioned polymers and various gases inert to polymer powder such as nitrogen. No particular limitation is imposed on the carrier gas.

Cyclone separators of the type employed routinely for gas-powder separation can be used in the present invention. Such cyclone separators are described, for example, in "Perry's Chemical Engineers' Handbook", 4th edition, PP 20–62, Gas Solid Separation.

The polymer powder, which has been separated by the cyclone separator, is drawn from a bottom part thereof into a hopper via a polymer powder guide. As the hopper, there may be employed a hopper composed of a cylindrical section through the top wall of which the above guide is opening, an inverted conical section extending downwardly from the cylindrical section, and a rotary feeder provided in a bottom part of the inverted conical section. The rotary feeder employed here is a conventionally-known rotary feeder. Namely, the rotary feeder is of such a structure that a vane wheel rotates within a cylinder disposed horizontally, each intervane spacing of the vane wheel is filled with the downwardly-fallen powder, and upon rotation of the vane wheel over 180°, the powder is discharged out to an outlet disposed underneath the vane wheel. The revolution speed of the rotary feeder may preferably be within a relatively lower revolution speed range in which the amount of the drawn-out polymer powder is proportional to the revolution speed.

A purge gas is introduced into a polymer powder guide extending from the cyclone separator to the hopper so as to prevent the powder from depositing on the inner wall of the guide and plugging the guide. A gas similar to that employed as the carrier gas is employed as the purge gas.

In the present invention, various known methods may be used to detect the height of the top of the powder in the hopper. Any method may be employed so long as a signal proportional to the powder level is output, including a method making use of a pressure difference, a method relying upon an ultrasonic wave, a method employing a capacitance, and so on. No particular limitation is imposed.

When the height of the top of the powder in the hopper varies, the revolution speed of the rotary feeder is either increased or decreased in accordance with the degree of the detected variation. Namely, the revolution speed of the rotary feeder is increased as the powder level increases while the revolution speed of the rotary feeder is decreased as the height of the top of the powder decreases.

The volume of the purge gas, which is introduced for the prevention of clogging of the polymer powder guide between the cyclone separator and hopper, is either increased or decreased in accordance with variations in the powder level, namely, variations in the revolution speed of the rotary feeder. Namely, the volume of the purge gas supplied to the polymer powder guide is maintained constant when the revolution speed of the rotary feeder is of a predetermined value or higher, but when the revolution speed of the rotary feeder has dropped beyond the predetermined value, the volume of the purge gas supplied to the polymer powder guide is increased in accordance with the degree of reduction of the revolution speed. The control of the purge gas may be effected by adjusting the opening degree of a valve through which the purge gas is introduced. It may be effectively achieved by introducing the purge gases intermittently and changing the length of the closure-to-opening interval of its introduction.

One embodiment of this invention will hereinafter be described with reference to the accompanying sole drawing.

A stream of a mixture of polymer powder and a carrier gas is introduced through a line 1 into a cyclone separator 2. The polymer powder and carrier gas are separated from each other in the cyclone separator 2, and the carrier gas is drawn out of the cyclone separator 2 through a line 7. On the other hand, the thus-separated polymer powder is delivered to a hopper 3. A purge gas is introduced through a line 4 into the guide between the cyclone separator 2 and the hopper 3 as described above.

The polymer powder, which has been stored in the hopper 3, is discharged out of the hopper 3 while controlling the revolution speed of the rotary feeder 5 in accordance with variations in the signal from a level gauge 8 due to variations in the powder level and maintaining the powder level at a constant level. The thus-discharged polymer powder is then conveyed, for example, by a screw conveyor 6 to a desired place.

The control of the rotary feeder 5 is effected by either increasing or lowering its revolution speed by means of a controlling system 15; in accordance with the powder level as described above. When the guide, which extends from the cyclone separator 2 to the hopper 3, is plugged, the height of the top of the powder in the hopper 3 is reduced and a signal is output from the level gauge 8 so as to reduce the revolution speed of the rotary feeder 5. When the revolution speed drops beyond a predetermined value, a valve 10 is controlled by a control system 9 in such a way that the closing period of the valve 10 becomes shorter, whereby the volume of the purge gas through the line 4 is increased. When the revolution speed is reduced further beyond a predetermined value, the valve 10 is operated by the control system 9 in such a way that the closing period of the value 10 becomes still shorter. It is not effective for the prevention of plugging if the volume of the purge gas is increased by simply increasing the opening degree of the valve 10. It is effective to change the closing period of the valve 10.

Purge gas is also introduced into the bottom of the hopper 9 via a line 13 containing a valve 12. If necessary, it is possible to control the volume of the purge gas to the point above and near the rotary feeder 5 in the lower part of the hopper 3 in such a way that the closing period of the valve 12 is increased by a control system 11 when the height of the top of the powder is increased and the revolution speed of the rotary feeder 5 is increased to a predetermined level or higher. In order to conduct the separation of the gas stream and powder with good efficiency, a trickle dumper 14 which opens or closes depending on the weight of powder in the cyclone separator is usually provided in a bottom part of the cyclone separator 2. On the other hand, the discharge of the polymer powder from the hopper 3 is effected by the rotary feeder 5. Therefore, the valve 12 is operated or controlled seldom even when the volume of the purge gas through the line 13 is automatically controlled. The illustrated apparatus is operated usually with the valve 12 closed.

Practice of the method of this invention permits efficient separation of the stream of the mixture of the polymer powder and carrier gas into the polymer powder and carrier gas without troubles such as plugging. The method of this invention is therefore extremely useful from the industrial standpoint.

One example of this invention will next be given together with a comparative example to describe the present invention more specifically. Example:

Using the apparatus shown in the accompanying drawing and equipped with a cyclone separator having a separation capacity of 30 tons of powder per hour and a hopper having a capacity of 40 $m^3$, separation of polypropylene powder was conducted from a stream of a mixture of the polypropylene powder and propylene gas flowed out from bulk polymerization of propylene. However, the valve 12 was normally closed, and a bag filter was provided in the line 7.

A stream of a mixture composed of 6 tons/hr of polypropylene powder having an average particle size of 0.8 mm and 8 tons/hr of propylene gas was fed through the line 1 to the cyclone separator 2, whereby the polypropylene powder was separated substantially in its entirety from the propylene gas. The propylene gas was discharged through the line 7.

The thus-separated polypropylene powder was allowed to fall through the bottom part of the cyclone separator 2 and the trickle dumper 14 into the hopper 3. Propylene gas was introduced to a point above and near the trickle dumper 14 via the valve 10 and the line 4. The introduction of propylene gas was effected at 40 $m^3$/hr for 3 seconds at an interval of 27 seconds.

The polypropylene powder which had been stored in the hopper 3 was then drawn out of the hopper 3 by means of the rotary feeder 5, which was rotated usually at 40 rpm, while the height of the top of the powder in the hopper was maintained at a constant level. The propylene powder was then fed out of the system at 6 tons/hr by the screw conveyor 6.

When the operation of the apparatus was continued in the above-described manner, the revolution speed of the rotary feeder 5 was controlled within a range of (usual revolution number $\pm$20 rpm) due to deposit of polypropylene powder on an area above the trickle dumper 14 or variations in the amount of polypropylene powder supplied. On the other hand, the closing period of the valve 10 was controlled approximately once an hour within a range of (usual period $\pm$15 seconds).

COMPARATIVE EXAMPLE

The apparatus was operated in the same manner as in the Example except that the closing period of the valve 10 was not controlled in accordance with the revolution speed of the rotary feeder 5. Upon an elapsed time of 2 hours, the internal pressure of the cyclone separator 2 increased due to clogging of a bag filter (not shown) provided in the line 7 and the operation of the apparatus was therefore stopped. Upon inspection of the cyclone separator 2, the clogging of the bag filter was found to have occurred because the interior of the cyclone separator 2 had been filled up with the polypropylene powder, and the polypropylene powder, which had been introduced through the line 1, had been allowed to flow out through the line 7 without its separation from the carrier gas. The plugging of the interior of the cyclone separator 2 was induced because the introduced volume of propylene as the purge gas had not been increased when the polypropylene powder had started accumulating above the trickle dumper 14.

What is claimed is:

1. In method for separating polymer powder from a carrier gas by introducing a stream of a mixture of the polymer powder and the carrier gas into a cyclone separator, drawing the polymer powder, which has been separated from the carrier gas, through a bottom part of the cyclone separator into a hopper, drawing the carrier gas from an upper part of the cyclone separator and feeding out the polymer by a rotary feeder from the bottom part of the hopper, the improvements wherein:

(a) the revolution speed of the rotary feeder is controlled in accordance with variations in the powder level in the hopper so as to control the amount of the polymer powder to be discharged out from the hopper, and (b) the volume of a purge gas which is introduced into a polymer powder guide extending between the cyclone separator and the hopper for the prevention of plugging thereof is controlled in accordance with variations in the revolution speed of the rotary feeder, whereby the plugging of the guide between the cyclone separator and the hopper are prevented and the powder level in the hopper is maintained at a predetermined constant level.

2. The method as claimed in claim 1, wherein:

(a) the purge gas introduced for the prevention of clogging is introduced intermittently and (b) the volume of the purge gas is controlled by changing the length of the closure-to-opening interval of its introduction.

3. The method as claimed in claim 1, wherein the revolution speed of the rotary feeder is decreaseed and the volume of the purge gas which is introduced into the polymer powder guide for the prevention of plugging is increased as the height of the top of the powder becomes lower than the predetermined constant level.

4. The method as claimed in claim 1, wherein the volume of the purge gas is controlled by changing the intervals of the intermittent introduction of the gas.

* * * * *